US007654419B2

(12) United States Patent
Dobbs et al.

(10) Patent No.: US 7,654,419 B2
(45) Date of Patent: Feb. 2, 2010

(54) DISPENSER HAVING ELASTOMER DISCHARGE VALVE

(75) Inventors: Douglas B. Dobbs, Yorba Linda, CA (US); Kevin O'Neill, Wrightwood, CA (US); Steven G. Phan, Garden Grove, CA (US)

(73) Assignee: MeadWestvaco Calmar, Inc., Grandview, MO (US)

(*) Notice: Subject to any disclaimer, the term of this patent is extended or adjusted under 35 U.S.C. 154(b) by 0 days.

(21) Appl. No.: 10/943,252

(22) Filed: Sep. 17, 2004

(65) Prior Publication Data

US 2006/0060609 A1 Mar. 23, 2006

(51) Int. Cl.
*G01F 11/00* (2006.01)

(52) U.S. Cl. .................................... 222/321.9; 222/380

(58) Field of Classification Search .............. 222/321.3, 222/321.6–321.9, 491–494, 148, 402.12, 222/380, 381, 387, 628, 381.1, 321.1; 239/492, 239/464, 533.12
See application file for complete search history.

(56) References Cited

U.S. PATENT DOCUMENTS

| | | | | |
|---|---|---|---|---|
| 2,583,340 | A | 1/1952 | Olsen | |
| 2,743,852 | A | 5/1956 | Alberdi, Jr. | |
| 2,974,835 | A * | 3/1961 | Herbrick | 222/507 |
| 3,129,894 | A | 4/1964 | Schermerhorn | |
| 3,561,644 | A * | 2/1971 | Works et al. | 222/95 |
| 3,602,407 | A | 8/1971 | Grothoff | |
| 4,109,836 | A | 8/1978 | Falarde | |
| 4,739,906 | A | 4/1988 | LoTurco | |
| 4,767,034 | A * | 8/1988 | Cramer | 222/525 |
| 4,877,160 | A | 10/1989 | Derving | |
| 4,938,393 | A | 7/1990 | Ericson et al. | |
| 5,105,997 | A | 4/1992 | Wakabayashi et al. | |
| 5,154,325 | A | 10/1992 | Ryder et al. | |
| 5,186,368 | A * | 2/1993 | Garcia | 222/490 |
| 5,240,149 | A * | 8/1993 | Schmidt | 222/212 |
| 5,370,313 | A * | 12/1994 | Beard | 239/337 |
| 5,447,258 | A | 9/1995 | Suzuki | |
| 5,518,377 | A | 5/1996 | Bougamont et al. | |
| 5,687,884 | A | 11/1997 | Bodin et al. | |

(Continued)

FOREIGN PATENT DOCUMENTS

| | | |
|---|---|---|
| EP | 0864371 | 9/1998 |

(Continued)

OTHER PUBLICATIONS

"European Search Report," EP1637232A1, Mar. 22, 2006.

*Primary Examiner*—Lien T Ngo

(57) ABSTRACT

A manual pump dispenser includes a plunger head reciprocable between pressure and return strokes, and a pump body having an inlet valve for inletting of liquid product during each of the return strokes. A discharge valve assembly is fitted to a spout for permitting selective outletting of liquid product through the spout during each of the pressure strokes. The spout includes a bore having a predetermined diameter, with a unitary valve disposed substantially within the bore. The unitary valve is made of a material for permitting predetermined axial, or axial and radial expansion thereof under pressure from liquid product during each of the pressure strokes for thereby allowing liquid product to be discharged through a slitted opening in the unitary valve, and enabling rapid contraction thereof against a valve seat to prevent liquid product from being discharged through the slitted opening.

20 Claims, 3 Drawing Sheets

U.S. PATENT DOCUMENTS

| | | | | |
|---|---|---|---|---|
| 5,836,484 | A * | 11/1998 | Gerber | 222/494 |
| 5,863,487 | A | 1/1999 | Guergov | |
| 5,890,655 | A | 4/1999 | Collias et al. | |
| 5,944,702 | A | 8/1999 | Py | |
| 6,161,732 | A * | 12/2000 | Albini | 222/321.3 |
| 6,234,363 | B1 * | 5/2001 | Stradella | 222/402.12 |
| 6,378,742 | B1 * | 4/2002 | Rohr et al. | 222/494 |
| 6,422,434 | B1 | 7/2002 | Lammond Wass et al. | |
| 6,443,370 | B1 * | 9/2002 | Brulle et al. | 239/333 |
| 6,494,346 | B2 | 12/2002 | Gross et al. | |
| 7,559,440 | B2 | 7/2009 | Rueschhoff et al. | |
| 7,575,134 | B2 | 8/2009 | Martin et al. | |
| 2002/0179650 | A1 | 12/2002 | Mascitelli | |
| 2005/0115984 | A1 * | 6/2005 | Pritchett et al. | 222/95 |
| 2005/0139614 | A1 * | 6/2005 | Garcia | 222/321.7 |
| 2009/0152306 | A1 | 6/2009 | Pardes et al. | |
| 2009/0173391 | A1 | 7/2009 | Choksi | |
| 2009/0173755 | A1 | 7/2009 | Ogawa et al. | |

FOREIGN PATENT DOCUMENTS

| | | | |
|---|---|---|---|
| EP | 1565270 | A1 | 8/2005 |
| FR | 1539302 | A | 9/1968 |
| FR | 2785222 | A1 | 5/2000 |
| WO | WO2006018489 | | 2/2006 |

* cited by examiner

DISPENSER HAVING ELASTOMER DISCHARGE VALVE

BACKGROUND OF INVENTION a. Field of Invention

The invention relates generally to a manually actuated pump dispenser having an improved discharge valve member, and more particularly to such a valve member of elastomeric material capable of a quick shut-off of the discharge and having a slitted valve element for discharging personal use products such as hand lotions or the like.

b. Description of Related Art

The known manually actuated pump dispensers especially those designed for the dispensing of hand lotions, body lotions, liquid soaps, and other viscous products, typically have both inlet and outlet ball check valves for respectively controlling the flow of liquid product into the pump chamber on each piston suction stroke and for controlling the outflow of the liquid product from the pump chamber during each piston compression stroke. Alternatively, such dispensers may include an inlet ball check valve for controlling the flow of liquid product into the pump chamber and a deformable outlet valve disposed adjacent a discharge end of the spout. U.S. Pat. No. 5,447,258 (hereinafter "the '258 Patent") is exemplary of such a known pump dispenser.

Specifically, as illustrated in FIGS. 2-5 of the '258 Patent, for the conventional spout as therein disclosed, the end of the spout includes a transverse hole 134 covered by an expandable/stretchable cap 135 having an internal annular bead seated within an external annular groove on the spout for maintaining the cap in place (FIG. 2). A discharge opening 136 is located in an end wall of the cap through which product is discharged upon operation of the pump as product flows through both the axial discharge passage 130 of the spout and through transverse hole 134. In order to more securely attach cap 135 in place, a fixed ring 137 is provided in the FIGS. 3, 4 embodiment or a fixed ring 237 is provided for the FIG. 5 embodiment.

The deformable outlet valve (i.e. cap 135) disclosed in FIGS. 2-5 of the '258 Patent is problematic in many respects, in that cap 135 will simply dislodge from the end of the spout upon application of even slight pressure applied through axial passage 130 and transverse hole 134. This is tacitly recognized as the FIGS. 3 to 5 embodiments require a fixed ring 137 or 237 to maintain cap 135 securely mounted in place at the end of the spout. However, the provision of the extra fixed ring 137 or 237 requires an extra part for securing cap 135 during manufacture of the pump dispenser, and further increases the likelihood of the dispenser failing due to dislodgement of cap 135 during repeated pumping operation.

It would therefore be of benefit to provide a pump dispenser including an improved deformable outlet valve which both facilitates assembly of the pump dispenser, and which is securely disposed at an end of the dispenser spout for reducing or virtually eliminating the odds of the valve being dislodged from the spout.

Yet further, as illustrated in FIG. 1 of the '258 Patent, there is disclosed an improved outlet valve assembly including first and second valve bodies 7, 11, respectively. For the dispenser of FIG. 1, as fluid passes from pipe 2 into hole 5, second valve body 11, which is made of flexible synthetic resin, deforms outwardly to discharge the contents of pipe 2 therethrough and thereafter should return to its rest configuration illustrated in FIG. 1.

As discussed above for cap 135 disclosed in FIGS. 2-5 of the '258 Patent, the valve assembly disclosed in FIG. 1 of the '258 Patent is also problematic in many respects, in that after repeated use, the interaction of product against the inner walls of body 11 and product remaining between shaft 6 and body 11 increases the time it takes for body 11 to close around shaft 6 and thereby prevent further product from being discharged. The interaction of product against the inner walls of body 11 can eventually cause the structure forming body 11 to remain in an outwardly deformed configuration. This condition deteriorates the cross-sectional quality of the discharged product, which at the initial use of the dispenser mechanism, is intended to have a predetermined cross-section designed to be ergonomically pleasing to the user and/or designed for a specific end use. Further, the valve assembly disclosed in FIG. 1 of the '258 Patent includes at least three components fitted together for adequate operation, namely first and second valve bodies 7, 11, respectively, and stopper 22, which render the design thereof complex with regard to the manufacture thereof, and which further increase the odds of failure of one or more of the components.

It would therefore be of benefit to provide a pump dispenser having an improved deformable outlet valve which both facilitates easier and more economical manufacture and assembly of the pump dispenser, which provides repeatability in the cross-sectional quality of the discharged product over the life of the pump dispenser, and which is robust in design and efficient to operate. It would also be of benefit to provide a pump dispenser which will quickly respond for sealing the discharge flow path during each piston suction stroke irrespective of the viscosity of the product being dispensed.

SUMMARY OF INVENTION

The invention solves the problems and overcomes the drawbacks and deficiencies of prior art pump dispenser designs by providing in combination an improved deformable outlet valve which both facilitates manufacture and assembly of the pump dispenser, and which provides repeatability in the cross-sectional quality of the discharged product over the life of the pump dispenser.

The present invention thus provides a manual pump dispenser including a plunger head reciprocable between pressure and return strokes. The pump dispenser may include a pump body having an inlet valve for inletting of a liquid product into the pump dispenser during each of the return strokes, and a discharge valve assembly fitted to a spout provided with the pump body. The discharge valve assembly may permit selective outletting of the liquid product through the spout during each of the pressure strokes. The spout may include a bore having a predetermined diameter. The discharge valve assembly may include a unitary valve disposed substantially within the bore, the unitary valve having an outer diameter smaller than the predetermined diameter. The unitary valve may be made of a material for permitting predetermined axial and radial expansion of the unitary valve under pressure from the liquid product during each of the pressure strokes for thereby allowing the liquid product to be discharged out through a slitted opening at an outlet end of the unitary valve, and enabling rapid contraction of the unitary valve against a valve seat to prevent the liquid product from being discharged through the slitted opening.

For the pump dispenser described above, the unitary valve may include a plurality of slitted openings oriented such that the liquid product discharged therethrough includes a substantially star-shaped cross-section. The pump dispenser may further include a valve adaptor with the unitary valve being coupled to the valve adaptor for retaining the unitary valve within the spout. The valve adaptor and the unitary valve may be coupled together by the provision of an annular groove and an annular rib, or an annular rib and an annular wall. The valve adaptor may include an axial channel for passage of the liquid product from an upstream end of the spout toward the slitted opening. The valve adaptor may include a plurality of lateral passageways fluidly coupled with the axial channel for enabling uniform distribution of the liquid product from the upstream end of the spout toward the slitted opening. The valve seat may be formed integrally with the valve adaptor. The unitary valve may be formed of a silicone and/or a thermoplastic elastomer, and may be expandable within the bore. The unitary valve may primarily be radially contractible against a circumferential surface of the valve seat to prevent the liquid product from being discharged through the slitted opening. The unitary valve may include a generally cylindrical profile in its contracted configuration. The unitary valve may alternatively be axially and radially contractible against respective frontal and circumferential surfaces of the valve seat to prevent the liquid product from being discharged through the slitted opening. The unitary valve may also alternatively include a generally frusto-conical profile in its contracted configuration.

The invention yet further provides a plunger head for a manually actuated pump dispenser, being reciprocable between pressure and return strokes, and including a discharge spout. The plunger head may include a pump body having an inlet valve for inletting of a liquid product into the pump dispenser during each of the return strokes. A discharge valve assembly may be fitted to the spout for permitting selective outletting of the liquid product through the spout during each of the pressure strokes. The spout may include a bore having a predetermined diameter. The discharge valve assembly may include an outlet valve disposed substantially within the bore. The outlet valve may include an outer diameter smaller than the predetermined diameter. The outlet valve may be made of a material for permitting predetermined axial and radial expansion of the outlet valve under pressure from the liquid product during each of the pressure strokes for thereby allowing the liquid product to be discharged out through a slitted opening at an outlet end of the outlet valve, and enabling rapid contraction of the outlet valve against a valve seat to prevent the liquid product from being discharged through the slitted opening.

For the plunger head described above, the outlet valve may include a plurality of slitted openings oriented such that the liquid product discharged therethrough includes a substantially star-shaped cross-section. The plunger head may further include a valve adaptor with the outlet valve being coupled to the valve adaptor for retaining the outlet valve within the spout. The valve adaptor and the outlet valve may be coupled together by the provision of an annular groove and an annular rib, or an annular rib and an annular wall. The valve adaptor may include an axial channel for passage of the liquid product from an upstream end of the spout toward the slitted opening. The valve adaptor may include a plurality of lateral passageways fluidly coupled with the axial channel for enabling uniform distribution of the liquid product from the upstream end of the spout toward the slitted opening. The valve seat may be formed integrally with the valve adaptor. The outlet valve may be formed of a silicone and/or a thermoplastic elastomer, and may be expandable within the bore. The outlet valve may primarily be radially contractible against a circumferential surface of the valve seat to prevent the liquid product from being discharged through the slitted opening. The outlet valve may include a generally cylindrical profile in its contracted configuration. The outlet valve may alternatively be axially and radially contractible against respective frontal and circumferential surfaces of the valve seat to prevent the liquid product from being discharged through the slitted opening. The outlet valve may also alternatively include a generally frusto-conical profile in its contracted configuration.

The invention yet further provides a discharge spout including an inlet end for inletting of a liquid product. A discharge valve assembly may be fitted to the spout for permitting selective outletting of the liquid product through the spout. The spout may include a bore having a predetermined diameter. The discharge valve assembly may include an outlet valve disposed substantially within the bore. The outlet valve may have an outer diameter smaller than the predetermined diameter. The outlet valve may be made of a material for permitting predetermined axial and radial expansion of the outlet valve when under pressure from the liquid product for thereby allowing the liquid product to be discharged out through a slitted opening at an outlet end of the outlet valve, and enabling rapid contraction of the outlet valve against a valve seat to prevent the liquid product from being discharged through the slitted opening.

For the discharge spout described above, the outlet valve may include a plurality of slitted openings oriented such that the liquid product discharged therethrough includes a substantially star-shaped cross-section. The discharge spout may further include a valve adaptor with the outlet valve being coupled to the valve adaptor for retaining the outlet valve within the spout. The valve adaptor and the outlet valve may be coupled together by the provision of an annular groove and an annular rib, or an annular rib and an annular wall. The valve adaptor may include an axial channel for passage of the liquid product from an upstream end of the spout toward the slitted opening. The valve adaptor may include a plurality of lateral passageways fluidly coupled with the axial channel for enabling uniform distribution of the liquid product from the upstream end of the spout toward the slitted opening. The valve seat may be formed integrally with the valve adaptor. The outlet valve may be formed of a silicone and/or a thermoplastic elastomer, and may be expandable within the bore. The outlet valve may primarily be radially contractible against a circumferential surface of the valve seat to prevent the liquid product from being discharged through the slitted opening. The outlet valve may include a generally cylindrical profile in its contracted configuration. The outlet valve may alternatively be axially and radially contractible against respective frontal and circumferential surfaces of the valve seat to prevent the liquid product from being discharged through the slitted opening. The outlet valve may also alternatively include a generally frusto-conical profile in its contracted configuration.

The invention further provides a manual pump dispenser including a plunger head reciprocable between pressure and return strokes. The pump dispenser may include a pump body having an inlet valve for inletting of a liquid product into the pump dispenser during each of the return strokes. A discharge valve assembly may be fitted to a spout provided with the pump body. The discharge valve assembly may permit selective outletting of the liquid product through the spout during each of the pressure strokes. The spout may include a bore having a predetermined diameter. The discharge valve assembly may include a unitary valve disposed substantially within the bore. The unitary valve may have an outer diameter generally equal to the predetermined diameter. The unitary valve may be made of a material for permitting primarily predetermined axial expansion of the unitary valve under pressure from the liquid product during each of the pressure strokes for thereby allowing the liquid product to be discharged out through a slitted opening at an outlet end of the unitary valve, and enabling rapid axial contraction of the unitary valve against a valve seat to prevent the liquid product from being discharged through the slitted opening.

For the pump dispenser described above, the unitary valve may include a plurality of slitted openings oriented such that the liquid product discharged therethrough includes a substantially star-shaped cross-section. The pump dispenser may further include a valve adaptor with the unitary valve being coupled to the valve adaptor for retaining the unitary valve within the spout. The valve adaptor and the unitary valve may be coupled together by the provision of an annular groove and an annular rib, or an annular rib and an annular wall. The valve adaptor may include an axial channel for passage of the liquid product from an upstream end of the spout toward the slitted opening. The valve adaptor may include a plurality of lateral passageways fluidly coupled with the axial channel for enabling uniform distribution of the liquid product from the upstream end of the spout toward the slitted opening. The valve seat may be formed integrally with the valve adaptor. The unitary valve may be formed of a silicone and/or a thermoplastic elastomer, and may be axially expandable outwardly from the bore. The unitary valve may be primarily axially contractible against a frontal surface of the valve seat to prevent the liquid product from being discharged through the slitted opening. The unitary valve may include a generally cylindrical profile in its contracted configuration, and a frontal surface of the unitary valve may be substantially thicker than a side wall of the unitary valve.

The invention yet further provides a plunger head for a manually actuated pump dispenser, the plunger head being reciprocable between pressure and return strokes and including a discharge spout. The plunger head may include a pump body having an inlet valve for inletting of a liquid product into the pump dispenser during each of the return strokes. A discharge valve assembly may be fitted to the spout for permitting selective outletting of the liquid product through the spout during each of the pressure strokes. The spout may include a bore having a predetermined diameter. The discharge valve assembly may include an outlet valve disposed substantially within the bore, the outlet valve may have an outer diameter generally equal to the predetermined diameter. The outlet valve may be made of a material for permitting primarily predetermined axial expansion of the outlet valve under pressure from the liquid product during each of the pressure strokes for thereby allowing the liquid product to be discharged out through a slitted opening at an outlet end of the outlet valve, and enabling rapid axial contraction of the outlet valve against a valve seat to prevent the liquid product from being discharged through the slitted opening.

For the plunger head described above, the outlet valve may include a plurality of slitted openings oriented such that the liquid product discharged therethrough includes a substantially star-shaped cross-section. The plunger head may further include a valve adaptor with the outlet valve being coupled to the valve adaptor for retaining the outlet valve within the spout. The valve adaptor and the outlet valve may be coupled together by the provision of an annular groove and an annular rib, or an annular rib and an annular wall. The valve adaptor may include an axial channel for passage of the liquid product from an upstream end of the spout toward the slitted opening. The valve adaptor may include a plurality of lateral passageways fluidly coupled with the axial channel for enabling uniform distribution of the liquid product from the upstream end of the spout toward the slitted opening. The valve seat may be formed integrally with the valve adaptor. The outlet valve may be formed of a silicone and/or a thermoplastic elastomer, and may be axially expandable outwardly from the bore. The outlet valve may be primarily axially contractible against a frontal surface of the valve seat to prevent the liquid product from being discharged through the slitted opening. The outlet valve may include a generally cylindrical profile in its contracted configuration, and a frontal surface of the outlet valve may be substantially thicker than a side wall of the outlet valve.

The invention also provides a discharge spout including an inlet end for inletting of a liquid product. A discharge valve assembly may be fitted to the spout for permitting selective outletting of the liquid product through the spout. The spout may include a bore having a predetermined diameter. The discharge valve assembly may include an outlet valve disposed substantially within the bore. The outlet valve may have an outer diameter generally equal to the predetermined diameter. The outlet valve may be made of a material for permitting primarily predetermined axial expansion of the outlet valve when under pressure from the liquid product for thereby allowing the liquid product to be discharged out through a slitted opening at an outlet end of the outlet valve, and enabling rapid axial contraction of the outlet valve against a valve seat to prevent the liquid product from being discharged through the slitted opening.

For the discharge spout described above, the outlet valve may include a plurality of slitted openings oriented such that the liquid product discharged therethrough includes a substantially star-shaped cross-section. The discharge spout may further include a valve adaptor with the outlet valve being coupled to the valve adaptor for retaining the outlet valve within the spout. The valve adaptor and the outlet valve may be coupled together by the provision of an annular groove and an annular rib, or an annular rib and an annular wall. The valve adaptor may include an axial channel for passage of the liquid product from an upstream end of the spout toward the slitted opening. The valve adaptor may include a plurality of lateral passageways fluidly coupled with the axial channel for enabling uniform distribution of the liquid product from the upstream end of the spout toward the slitted opening. The valve seat may be formed integrally with the valve adaptor. The outlet valve may be formed of a silicone and/or a thermoplastic elastomer, and may be axially expandable outwardly from the bore. The outlet valve may be primarily axially contractible against a frontal surface of the valve seat to prevent the liquid product from being discharged through the slitted opening. The outlet valve may include a generally cylindrical profile in its contracted configuration, and a frontal surface of the outlet valve may be substantially thicker than a side wall of the outlet valve.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention and are incorporated in and constitute a part of this specification, illustrate preferred embodiments of the invention and together with the detail description serve to explain the principles of the invention. In the drawings.

DETAILED DESCRIPTION OF THE PREFERRED EMBODIMENTS

Figures 1, 2, 3, 4:
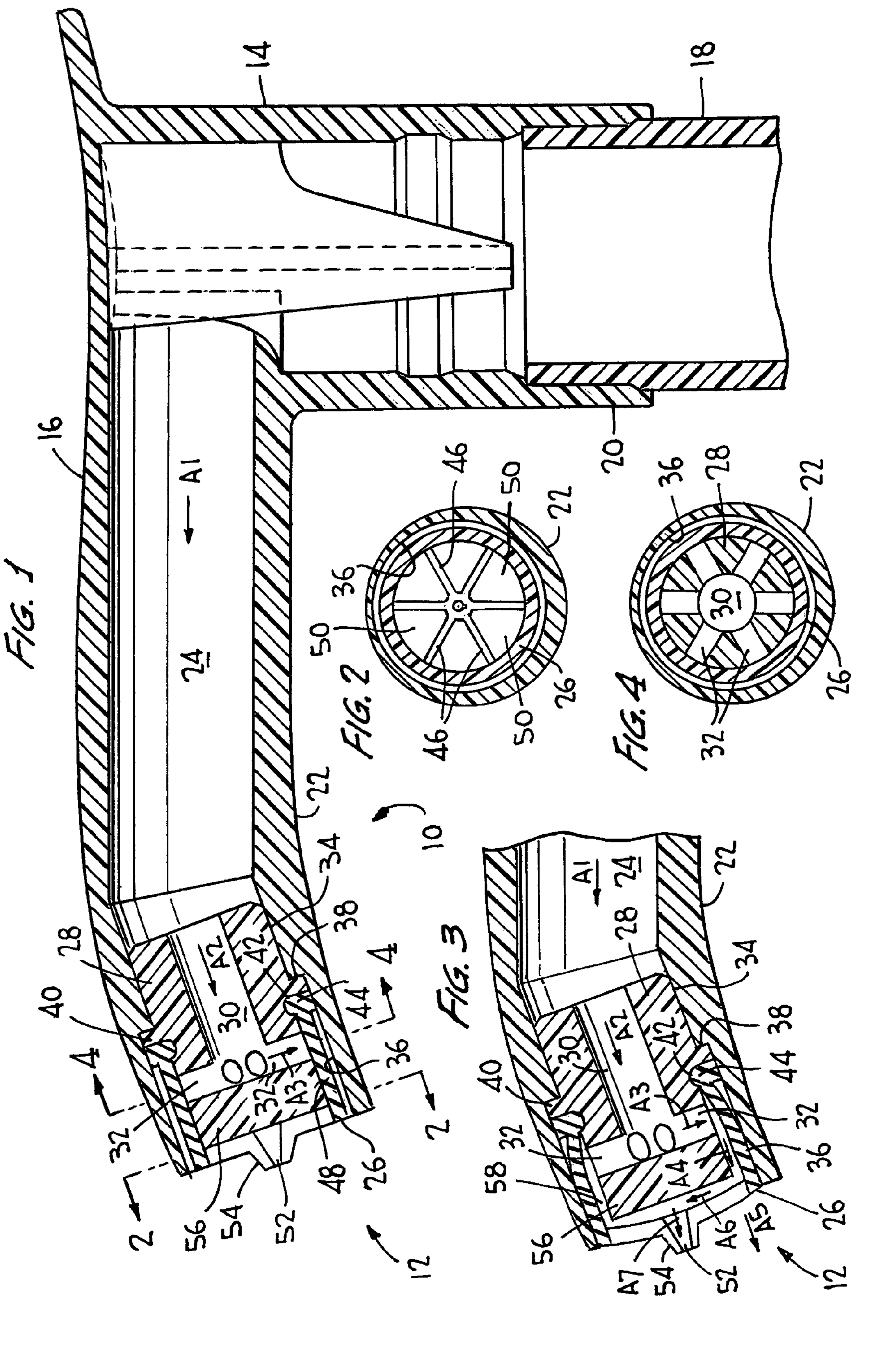
FIG. 1 is a side elevation view of a pump dispenser, partly broken away, according to the present invention, illustrating the various internal features of a first embodiment of the discharge valve assembly and the elastomeric discharge valve in a rest configuration.
FIG. 2 is a cross-sectional view of the discharge valve assembly of FIG. 1, taken substantially along line 2-2, illustrating the star-shaped valve outlet.
FIG. 3 is a partial side elevation view of the pump dispenser spout of FIG. 1, illustrating the first embodiment of the elastomeric discharge valve in a deformed discharge open configuration during pumping.
FIG. 4 is a cross-sectional view of the first embodiment of the discharge valve assembly of FIG. 1, taken substantially along line 4-4, illustrating the layout of the lateral passages.

Referring now to the drawings wherein like reference numerals designate like and corresponding parts throughout the several views, FIGS. 1-4 illustrate a first embodiment of a pump dispenser according to the present invention, generally designated 10.

As shown in FIG. 1, a manually operated pump dispenser 10 of a type which incorporates discharge valve assembly 12 according to the invention comprises a pump body which includes a pump cylinder (not shown) adapted to be affixed to a container (not shown) of product to be dispensed in a conventional manner, as described in detail in U.S. patent application Ser. No. 10/214,160, titled "Pump Dispenser Having an Improved Discharge Valve," owned by the Assignee of the present invention, and the disclosure of which is incorporated herein by reference. As also described in detail in U.S. patent application Ser. No. 10/214,160, the pump cylinder may be adapted to be affixed to a container by means of a closure cap which may be internally threaded or which may be adapted for snap fit engagement with the container neck in any normal manner. The cylinder may suspend a dip tube (not shown) at its lower end which extends into the liquid in the container. Although discharge valve assemblies 12, 102 and 202 (described below) for the first through third embodiments, respectively, have been described as being used in addition to a separate discharge valve provided within pump dispenser assemblies 10, 100 and 200 (described below), respectively, assemblies 12, 102 and 202 may be readily used in addition to or in lieu of a separate discharge valve provided within pump dispensers 10, 100 and 200, as would be apparent to those skilled in the art.

Pump dispenser 10 may further include a depending sleeve 14 for mounting plunger head 16 to an upper end of hollow piston stem 18 of a piston having at its lower end an annular piston seal (not shown) in sliding sealing engagement with the inner wall of the pump cylinder, as also described in detail in U.S. patent application Ser. No. 10/214,160. Plunger head 16 may include a depending sleeve 20 which frictionally engages the upper end of piston stem 18 to effect a tight seal, and an elongated transverse spout 22 defining a discharge passage 24 which directly communicates with the upper end of the piston stem.

Referring to FIGS. 1 and 3, discharge valve assembly 12 according to the present invention comprises a unitary valve 26 of resilient material such as a silicone or thermoplastic elastomer of various durometers. Valve 26 may be supported by valve adaptor 28 disposed at a distal end of spout 22, as described in greater detail below. Valve adaptor 28 may include an axial passage 30 which terminates in at least a pair of lateral passageways 32 with six such passageways 32 as illustrated in FIG. 4. Valve adaptor 28 may be frictionally or otherwise adhesively retained within bore 34 of spout 22.

As illustrated in FIGS. 1 and 3, spout 22 may include a further bore 36 at a distal end thereof such that bore 36 is slightly greater in diameter than bore 34 so as to provide a stop means at annular wall 38 for enabling a predetermined depth of insertion of valve adaptor 28 into bore 34 by engagement of annular rib 40 against complementary annular wall 38. An annular groove 42 may be provided along the outer circumference of valve adaptor 28 for facilitating engagement and retention of valve 26 with valve adaptor 28 by means of annular ring 44 of valve 26 being disposed in annular groove 42. The inner diameter of bore 36 in which valve 26 is seated may be slightly greater than the outer diameter of valve 26 to permit expansion of valve 26 upon the discharge of pressurized product through lateral passageways 32, as discussed in greater detail below.

Referring to FIGS. 1-3, in the particular embodiment illustrated, valve 26 may include a star-shaped (or other, i.e. triangular, circular, rectangular etc.) configuration defined by outlet slits 46, which in the embodiment of FIG. 2, may include six such outlet slits 46 formed integrally with circular skirt wall 48 of valve 26. Slits 46 may be defined as gaps between generally pie-shaped walls 50, which function to guide product through the adjacently disposed slits 46. It should be noted that instead of outlet slits 46, valve 26 may include a molded exit area (not shown), as would be apparent to those skilled in the art. Valve 26 may further include a central conical outlet 52 provided within protrusion 54 disposed at the central end of pie-shaped walls 50. While a small amount of product may be discharged through outlet 52, protrusion 54 primarily functions to maintain walls 50 at the predetermined orientation illustrated in FIG. 2.

In order for product to be discharged through valve 26 during the downward stroke of plunger head 16, for the orientation of slits 46 illustrated in FIG. 2, product discharged via spout 22 through valve 26 may first enter axial passage 30 of valve adaptor 28, as illustrated by flow-paths A1 and A2. Thereafter, product in axial passage 30 may generally uniformly enter lateral passageways 32 and divide into six flow-paths within the lateral passageways 32, as illustrated by flow-path A3. As pressure from the product in lateral passageways 32 continues to increase during the downward stroke of plunger head 16 and reaches a predetermined threshold, further increase of pressure from the product during the continuing downward stroke of plunger head 16 deforms and expands outer circular skirt wall 48 of valve 26 radially and walls 50 axially outwardly to permit product to pass by circular deflector 56, as illustrated by flow-path A4, and thereafter continue onwards and out through outlet slits 46, as illustrated by flow-path A5. While the majority of product may exit through outlet slits 46 via flow-path A5, some of the product may travel radially inwards towards outlet 52 via flow-path A6, and then exit out through outlet 52 via flow-path A7.

When manual pressure applied to plunger head 16 is released or is interrupted, the pressure of product in area 58 decreases below the aforementioned predetermined threshold, such that walls 50 and circular wall 48 of valve 26 quickly contract respectively axially and radially inwardly to reach their rest configuration, illustrated in FIGS. 1 and 3. Thus, at the end of a given downward stroke of the plunger head, just prior to the ensuing plunger up stroke, circular skirt wall 48 of valve 26 quickly contracts inwardly (i.e. relaxes) to prevent any further product from being discharged through outlet slits 46 of valve 26, and thereby closes outlet slits 46 by closing against lateral passageways 32 by the interaction of circular skirt wall 48 of valve 26 with the outer wall of circular deflector 56 formed integrally with valve adaptor 28.

With the flow of product from spout 22 through valve 26 via flow-paths A1-A7, the product output through valve 26 has a consistently uniform star-shaped cross-section by means of the sections of product output through outlet slits 46 and uniformly joined by outlet 52. Moreover, since the valve assembly according to the present invention includes only two components, namely valve adaptor 28 and unitary valve 26, the reduced number of components facilitates easy and economical manufacture and assembly of the pump dispenser, while providing repeatability in the cross-sectional quality of the discharged product over the life of the pump dispenser. Moreover, the efficient operation of unitary valve 26 provides a pump dispenser which will quickly respond for sealing the discharge flow path during each piston suction stroke irrespective of the viscosity of the product being dispensed. Additionally, since bore 36 is configured to control and limit the expansion of valve 26 disposed therein, this configuration prevents valve 26 from remaining in an expanded configuration (as is the case with conventional valve designs) during continued use of pump dispenser 10 due to dried or other viscous product remaining between circular skirt wall 48 and circular deflector 56.

The second embodiment of pump dispenser 100 will now be described in detail with reference to FIGS. 5-8.

Figures 5, 6, 7, 8:
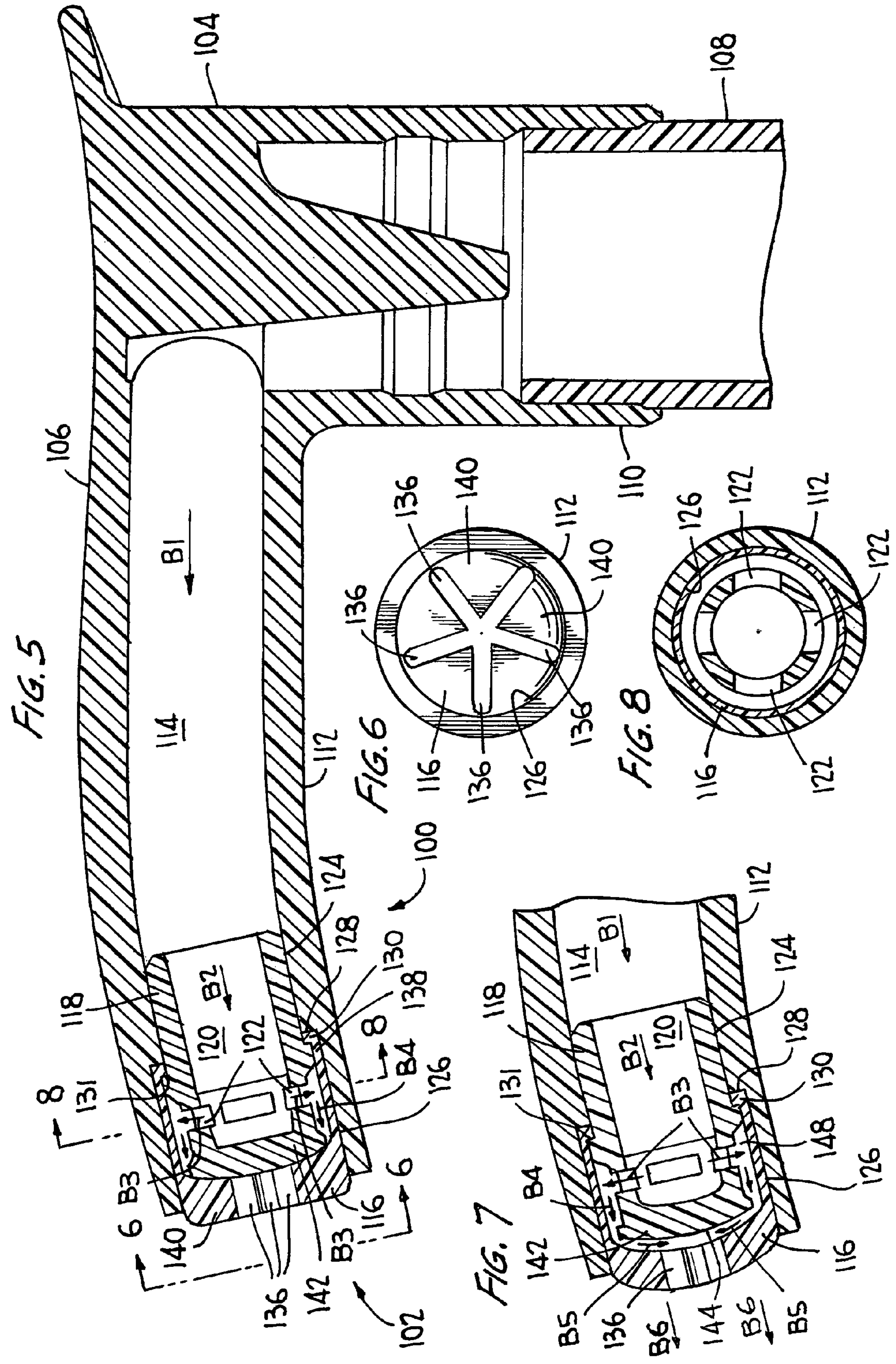
FIG. 5 is a side elevation view of a pump dispenser, partly broken away, according to the present invention, illustrating the various internal features of a second embodiment of the discharge valve assembly and the elastomeric discharge valve in a rest configuration.
FIG. 6 is a view of the discharge valve assembly of FIG. 5, taken substantially along line 6-6, illustrating the star-shaped valve outlet.
FIG. 7 is a partial side elevation view of the pump dispenser spout of FIG. 5, illustrating the second embodiment of the elastomeric discharge valve in a deformed discharge open configuration during pumping.
FIG. 8 is a cross-sectional view of the second embodiment of the discharge valve assembly of FIG. 5, taken substantially along line 8-8, illustrating the layout of the lateral passages.

As shown in FIG. 5, in a similar manner as the first embodiment of pump dispenser 10, pump dispenser 100 may likewise be a manually operated pump dispenser, described in detail in the aforementioned U.S. patent application Ser. No. 10/214,160. In addition to the standard components described above for pump dispenser 10, pump dispenser 100 may include a discharge valve assembly 102 and a depending sleeve 104 for mounting plunger head 106 to an upper end of hollow piston stem 108 of a piston having at its lower end an annular piston seal (not shown) in sliding sealing engagement with the inner wall of a pump cylinder. Plunger head 106 may include a depending sleeve 110 which frictionally engages the upper end of piston stem 108 to effect a tight seal, and an elongated transverse spout 112 defining a discharge passage 114 which directly communicates with the upper end of the piston stem.

Referring to FIGS. 5 and 8, the second embodiment of discharge valve assembly 102 according to the present invention comprises a unitary valve 116 of resilient material such as a silicone or thermoplastic elastomer of various durometers. Valve 116 may be supported by valve adaptor 118 disposed at a distal end of spout 112, as described in greater detail below. Valve adaptor 118 may include an axial passage 120 which terminates in at least a pair of lateral passageways 122 with four such passageways 122 as illustrated in FIG. 8. Valve adaptor 118 may be frictionally or otherwise adhesively retained within bore 124 of spout 112.

As illustrated in FIGS. 5 and 8, spout 112 may include a further bore 126 at a distal end thereof such that bore 126 is slightly greater in diameter than bore 124 so as to provide a stop means at annular wall 128 for enabling a predetermined depth of insertion of unitary valve 116 and valve adaptor 118 into bore 124. Unitary valve 116 may be retained within bore 126 by engagement of annular rib 130 of unitary valve 116 between circumferential wall 131 of valve adaptor 118 and complementary annular wall 128. The inner diameter of bore 126 in which valve 116 is seated may generally be equal to the outer diameter of valve 116 to permit axial expansion only of valve 116 upon the discharge of pressurized product through lateral passageways 122, as discussed in greater detail below.

Referring to FIGS. 5-8, in the particular embodiment illustrated, valve 116 may include a star-shaped (or other, i.e. triangular, circular, rectangular etc.) configuration defined by outlet slits 136, which in the embodiment of FIG. 6, may include five such outlet slits 136 formed integrally with circular skirt wall 138 of valve 116. Slits 136 may be defined as gaps between generally pie-shaped walls 140, which function to guide product through the adjacently disposed slits 136. It should be noted that instead of outlet slits 136, valve 116 may include a molded exit area (not shown), as would be apparent to those skilled in the art. Slits 136 may each terminate at the central axis of valve 116, such that a generally uniform star-shaped cross-section of product is discharged through slits 136. As illustrated in FIG. 5, skirt wall 138 may be formed of a substantially lesser thickness as compared to walls 140 defining slits 136 therebetween for permitting axial expansion only of valve 116 upon the discharge of pressurized product through lateral passageways 122.

In order for product to be discharged through valve 116 during the downward stroke of plunger head 106, for the orientation of slits 136 illustrated in FIG. 6, product discharged via spout 112 through valve 116 may first enter axial passage 120 of valve adaptor 118, as illustrated by flow-paths B1 and B2. Thereafter, product in axial passage 120 may generally uniformly enter lateral passageways 122 and divide into four flow-paths within the lateral passageways 122, as illustrated by flow-paths B3 and B4. As pressure from the product in lateral passageways 122 continues to increase during the downward stroke of plunger head 106 and reaches a predetermined threshold, further increase of pressure from the product during the continuing downward stroke of plunger head 106 deforms and expands valve 116 in an outwardly axial direction to unseat the structure forming walls 140 from valve seat 142 from the frontal surface 144 of valve seat 142, and thereafter allow product to continue onwards and out through outlet slits 136, as illustrated by flow-paths B5 and B6.

When manual pressure applied to plunger head 106 is released or is interrupted, the pressure of product in area 148 decreases below the aforementioned predetermined threshold, such that the structure forming walls 140 quickly contracts axially inwardly to reach its rest configuration against frontal surface 144 of valve seat 142, illustrated in FIGS. 5 and 7. Thus, at the end of a given downward stroke of the plunger head, just prior to the ensuing plunger up stroke, the structure forming walls 140 quickly contracts axially inwardly (i.e. relaxes) to prevent any further product from being discharged through outlet slits 136 of valve 116, and thereby closes outlet slits 136 by means of the structure forming walls 140 and valve seat 142.

With the flow of product from spout 112 through valve 116 via flow-paths B1-B6, the product output through valve 116 has a consistently uniform star-shaped cross-section by means of the product output through outlet slits 136. Moreover, since the valve assembly according to the present invention includes only two components, namely valve adaptor 118 and unitary valve 116, the reduced number of components facilitates easy and economical manufacture and assembly of the pump dispenser, while providing repeatability in the cross-sectional quality of the discharged product over the life of the pump dispenser. Furthermore, the efficient operation of unitary valve 116 provides a pump dispenser which will quickly respond for sealing the discharge flow path during each piston suction stroke irrespective of the viscosity of the product being dispensed.

The third embodiment of pump dispenser 200 will now be described in detail with reference to FIGS. 9-12.

Figures 9, 10, 11, 12:
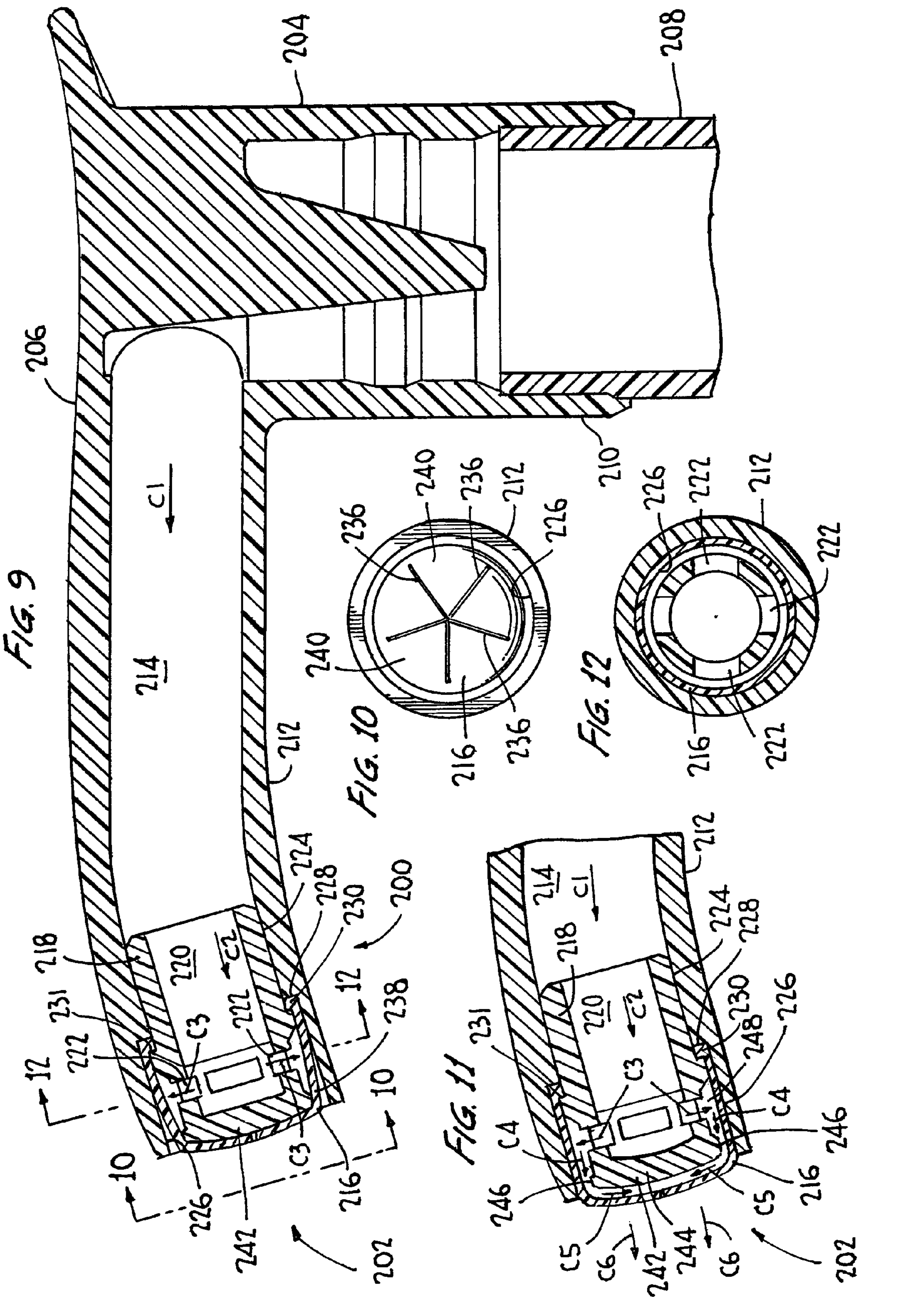
FIG. 9 is a side elevation view of a pump dispenser, partly broken away, according to the present invention, illustrating the various internal features of a third embodiment of the discharge valve assembly and the elastomeric discharge valve in a rest configuration.
FIG. 10 is a view of the discharge valve assembly of FIG. 9, taken substantially along line 10-10, illustrating the star-shaped valve outlet.
FIG. 11 is a partial side elevation view of the pump dispenser spout of FIG. 9, illustrating the third embodiment of the elastomeric discharge valve in a deformed discharge open configuration during pumping.
FIG. 12 is a cross-sectional view of the third embodiment of the discharge valve assembly of FIG. 9, taken substantially along line 12-12, illustrating the layout of the lateral passages.

As shown in FIG. 9, in a similar manner as the first and second embodiments of pump dispensers 10 and 100, respectively, pump dispenser 200 may likewise be a manually operated pump dispenser, described in detail in the aforementioned U.S. patent application Ser. No. 10/214,160. In addition to the standard components described above for pump dispensers 10 and 100, pump dispenser 200 may include a discharge valve assembly 202 and a depending sleeve 204 for mounting plunger head 206 to an upper end of hollow piston stem 208 of a piston having at its lower end an annular piston seal (not shown) in sliding sealing engagement with the inner wall of a pump cylinder. Plunger head 206 may include a depending sleeve 210 which frictionally engages the upper end of piston stem 208 to effect a tight seal, and an elongated transverse spout 212 defining a discharge passage 214 which directly communicates with the upper end of the piston stem.

Referring to FIGS. 9 and 12, the third embodiment of discharge valve assembly 202 according to the present invention comprises a unitary valve 216 of resilient material such as a silicone or thermoplastic elastomer of various durometers. Valve 216 may be supported by valve adaptor 218 disposed at a distal end of spout 212, as described in greater detail below. Valve adaptor 218 may include an axial passage 220 which terminates in at least a pair of lateral passageways 222 with four such passageways 222 as illustrated in FIG. 12. Valve adaptor 218 may be frictionally or otherwise adhesively retained within bore 224 of spout 212.

As illustrated in FIGS. 9 and 12, spout 212 may include a further bore 226 at a distal end thereof such that bore 226 is slightly greater in diameter than bore 224 so as to provide a stop means at annular wall 228 for enabling a predetermined depth of insertion of unitary valve 216 and valve adaptor 218 into bore 224. Unitary valve 216 may be retained within bore 226 by engagement of annular rib 230 of unitary valve 216 between wall 231 of valve adaptor 218 and complementary annular wall 228. The inner diameter of bore 226 in which valve 216 is seated may be slightly larger than the outer diameter of valve 216 to permit radial and axial expansion of valve 216 upon the discharge of pressurized product through lateral passageways 222, as discussed in greater detail below.

Referring to FIGS. 9-12, in the particular embodiment illustrated, valve 216 may include a star-shaped (or other, i.e. triangular, circular, rectangular etc.) configuration defined by expandable outlet slits 236, which in the embodiment of FIG. 10, may include five such outlet slits 236 formed integrally with frusto-conical skirt wall 238 of valve 216. Slits 236 may be defined as expandable gaps between generally pie-shaped walls 240, which function to guide product through the adjacently disposed slits 236. It should be noted that instead of outlet slits 236, valve 216 may include a molded exit area (not shown), as would be apparent to those skilled in the art. Slits 236 may each terminate at the central axis of valve 216, such that a generally uniform star-shaped cross-section of product is discharged through slits 236. As illustrated in FIG. 9, skirt wall 238 may be formed of a substantially similar thickness as walls 240 defining slits 236 therebetween for permitting axial and radial expansion of valve 216 upon the discharge of pressurized product through lateral passageways 222.

In order for product to be discharged through valve 216 during the downward stroke of plunger head 206, for the orientation of slits 236 illustrated in FIG. 10, product discharged via spout 212 through valve 216 may first enter axial passage 220 of valve adaptor 218, as illustrated by flow-paths C1 and C2. Thereafter, product in axial passage 220 may generally uniformly enter lateral passageways 222 and divide into four flow-paths within the lateral passageways 222, as illustrated by flow-paths C3 and C4. As pressure from the product in lateral passageways 222 continues to increase during the downward stroke of plunger head 206 and reaches a predetermined threshold, further increase of pressure from the product during the continuing downward stroke of plunger head 206 deforms and expands valve 216 in an outwardly axial and radial direction to unseat the structure forming walls 240 from valve seat 242 from the frontal and lateral surfaces, 244, 246, respectively, of valve seat 242, and thereafter allow product to continue onwards and out through outlet slits 236, as illustrated by flow-paths C5 and C6.

When manual pressure applied to plunger head 206 is released or is interrupted, the pressure of product in area 248 decreases below the aforementioned predetermined threshold, such that the structure forming walls 240 and skirt wall 238 quickly contract axially and radially inwardly to reach its rest configuration against valve seat 242, illustrated in FIGS. 9 and 11. Thus, at the end of a given downward stroke of the plunger head, just prior to the ensuing plunger up stroke, the structure forming walls 240 quickly contracts axially inwardly (i.e. relaxes) to prevent any further product from being discharged through outlet slits 236 of valve 216, and thereby closes outlet slits 236 by means of the structure forming walls 240, skirt wall 238 and valve seat 242.

With the flow of product from spout 212 through valve 216 via flow-paths C1-C6, the product output through valve 216 has a consistently uniform star-shaped cross-section by means of the product output through outlet slits 236. Moreover, since the valve assembly according to the present invention includes only two components, namely valve adaptor 218 and unitary valve 216, the reduced number of components facilitates easy and economical manufacture and assembly of the pump dispenser, while providing repeatability in the cross-sectional quality of the discharged product over the life of the pump dispenser. Furthermore, the efficient operation of unitary valve 216 provides a pump dispenser which will quickly respond for sealing the discharge flow path during each piston suction stroke irrespective of the viscosity of the product being dispensed.

As discussed above, various modifications may be made to the first, second and third embodiments of pump dispensers 10, 100 and 200, respectively, without departing from the scope of the present invention. For example, although a fixed number of lateral passageways 32, 122 and 222, respectively, are illustrated in FIGS. 4, 8 and 12, for the first through third embodiments, the number of lateral passages may be increased or decreased as needed to alter the distribution of product from axial passages 30, 120 and 220, respectively. Likewise, although a fixed number of outlet slits 46, 136 and 236 are illustrated in FIGS. 2, 6 and 10, respectively, for the first through third embodiments, the number of slits may be increased or decreased as needed to alter the cross-section of the product output. Further, although slits 46, 136 and 236 for the first through third embodiments, respectively, have been illustrated as including a generally rectangular cross-section, the cross-section of slits 46, 136 and 236 may be made elliptical, circular, include ridges or a variety of other shapes, for further altering the distribution and cross-section of product output therethrough. Moreover, whereas spout 22, 112 and 212 for the first through third embodiments, respectively, and the various components for discharge valve assemblies 12, 102 and 202, respectively, have been illustrated as including a generally circular cross-section, those skilled in the art would appreciate in view of this disclosure that the aforementioned components may include an elliptical, rectangular or other cross-sections, for further altering the cross-section of product output through spout 22, 112 and 212 for the first through third embodiments, respectively. Further, while discharge valve assemblies 12, 102 and 202 for the first through third embodiments, respectively, have been illustrated herein for a manually operated pump dispenser, those skilled in the art would also appreciate in view of this disclosure that discharge valve assemblies 12, 102 and 202 may be used with squeeze or non-manually operated pump dispensers as well, i.e. a dispenser having a manually deformable side wall or wall portion, or a dispenser having a pump motor for discharging liquid product. It should also be noted that although discharge valve assemblies 12, 102 and 202 for the first through third embodiments, respectively, have been described as being used in addition to a separate discharge valve provided within pump dispenser assemblies 10, 100 and 200, respectively, assemblies 12, 102 and 202 may be readily used in addition to or in lieu of a separate discharge valve provided within pump dispensers 10, 100 and 200, as would be apparent to those skilled in the art.

Although particular embodiments of the invention have been described in detail herein with reference to the accompanying drawings, it is to be understood that the invention is not limited to those particular embodiments, and that various changes and modifications may be effected therein by one skilled in the art without departing from the scope or spirit of the invention as defined in the appended claims.

What is claimed is:

1. A spout for a dispenser, comprising:
- a distal end;
- a bore in the spout defining a discharge passage through the spout;
- a second bore at the distal end of the spout, wherein the second bore comprises a greater diameter than the bore through the spout; and
- an annular wall between the bore and the second bore;
- a discharge valve assembly positioned in the distal end of the spout, wherein the discharge valve assembly further comprises:
- a valve adaptor, comprising:
  - an axial passage;
  - a circular deflector perpendicular to the axial passage;
  - lateral passageways adjacent the circular deflector and in communication with the axial passage;
  - an annular rib engaging the annular wall; and
  - an annular groove adjacent the annular rib;
- a unitary valve, comprising:
  - an annular ring disposed in the annular groove of the valve adaptor and between the valve adaptor and a surface of the second bore;
  - a wall at an outlet end of the unitary valve;
  - an expandable circular skirt wall extending from the annular ring to the wall; and
  - at least one outlet slit in the wall.

2. The spout of claim 1, wherein the expandable circular skirt wall further comprises a silicone material.

3. The spout of claim 1, wherein the expandable circular skirt wall further comprises a thermoplastic elastomer.

4. The spout of claim 1, wherein the expandable circular skirt wall is expandable within the second bore.

5. The spout of claim 1, wherein the at least one outlet slit in the wall further comprises a plurality of slitted openings.

6. The spout of claim 1, wherein the unitary valve further comprises:
- a protrusion extending outwards from a central end of the wall; and
- a central conical outlet in the protrusion.

7. The spout of claim 1, wherein the unitary valve is axially and radially contractible against the circular deflector of the valve adaptor.

8. The spout of claim 1, further comprising:
- a container;
- a fluid contained in the container;
- a pump cylinder in communication with the fluid in the container;
- a piston stem in communication with the pump cylinder; and
- wherein the spout is in communication with the piston stem.

9. A spout for a dispenser, comprising:
- a distal end;
- a bore in the spout defining a discharge passage through the spout;
- a second bore at the distal end of the spout, wherein the second bore comprises a greater diameter than the bore through the spout; and
- an annular wall between the bore and the second bore;
- a discharge valve assembly positioned in the distal end of the spout, wherein the discharge valve assembly further comprises:
- a valve adaptor, comprising:
  - an axial passage;
  - a valve seat perpendicular to the axial passage;
  - lateral passageways adjacent the valve seat and in communication with the axial passage;
  - a circumferential wall proximate to the annular wall;
- a unitary valve, comprising:
  - an annular rib disposed between the circumferential wall of the valve adaptor and the annular wall;
  - a wall at an outlet end of the unitary valve;
  - an expandable circular skirt wall extending from the annular ring to the wall; and
  - at least one outlet slit in the wall.

10. The spout of claim 9, wherein the expandable circular skirt wall further comprises a silicone material.

11. The spout of claim 9, wherein the expandable circular skirt wall further comprises a thermoplastic elastomer.

12. The spout of claim 9, wherein the expandable circular skirt wall is expandable within the second bore.

13. The spout of claim 9, wherein the at least one outlet slit in the wall further comprises a plurality of slitted openings.

14. The spout of claim 9, wherein the unitary valve is axially contractible against the valve seat of the valve adaptor.

15. The spout of claim 9, wherein the unitary valve is axially and radially contractible against the valve seat of the valve adaptor.

16. The spout of claim 9, further comprising:

a container;

a fluid contained in the container;

a pump cylinder in communication with the fluid in the container;

a piston stem in communication with the pump cylinder; and wherein the spout is in communication with the piston stem.

17. A plunger head comprising the spout of claim 1.

18. A plunger head comprising the spout of claim 9.

19. A pump dispenser comprising:

a plunger head; and the spout of claim 1.

20. A pump dispenser comprising:

a plunger head; and the spout of claim 9.

* * * * *